(12) United States Patent
Khan et al.

(10) Patent No.: US 12,501,513 B2
(45) Date of Patent: Dec. 16, 2025

(54) DETERMINATION OF INACTIVE EDRX CONFIGURATIONS FOR USER EQUIPMENT

(71) Applicant: Telefonaktiebolaget LM Ericsson (publ), Stockholm (SE)

(72) Inventors: Hamza Khan, Helsinki (FI); Mohammad Mozaffari, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 18/147,284

(22) Filed: Dec. 28, 2022

(65) Prior Publication Data

US 2024/0224377 A1 Jul. 4, 2024

(51) Int. Cl.
*H04W 52/02* (2009.01)
*G06N 3/08* (2023.01)
(Continued)

(52) U.S. Cl.
CPC .............. *H04W 76/28* (2018.02); *G06N 3/08* (2013.01); *H04W 52/0225* (2013.01); *H04W 68/02* (2013.01)

(58) Field of Classification Search
CPC ..... H04W 76/28; H04W 68/02; H04W 72/23; H04W 88/02; H04W 48/16;
(Continued)

(56) References Cited

U.S. PATENT DOCUMENTS

| 2017/0127470 A1* | 5/2017 | Vajapeyam | ........... H04W 76/28 |
| 2017/0273135 A1* | 9/2017 | Siomina | ................ H04W 68/02 |
| 2019/0104566 A1* | 4/2019 | Diachina | ................. H04L 47/28 |

FOREIGN PATENT DOCUMENTS

| EP | 4 017 139 A1 | 6/2022 | |
| WO | WO-2022116013 A1 * | 6/2022 | ............ H04W 76/28 |

OTHER PUBLICATIONS

ETSI TR 138 913 V16.0.0 (Jul. 2020), 5G; Study on scenarios and requirements for next generation access technologies (3GPP TR 38.913 version 16.0.0 Release 16), Jul. 2020 (42 pages).
(Continued)

*Primary Examiner* — Quan M Hua
(74) *Attorney, Agent, or Firm* — Rothwell, Figg, Ernst & Manbeck, P.C.

(57) ABSTRACT

There is provided techniques for determining INACTIVE eDRX configurations for UEs. The method is performed by a core network node. The method comprises performing an iterative learning process with the access network nodes to determine the INACTIVE eDRX configurations. The iterative learning process comprises transmitting a global parameter vector of a machine learning model to the access network nodes for determining the INACTIVE eDRX configurations of the UEs. The global parameter vector defines coefficients for the machine learning model for the current iteration. The iterative learning process comprises receiving local model parameter vectors with locally updated coefficients for the machine learning model from the access network nodes. The iterative learning comprises updating the global parameter vector for the next iteration as a function of all received local model parameter vectors until a stopping criterion is fulfilled.

18 Claims, 6 Drawing Sheets

(51) Int. Cl.
*H04W 76/28* (2018.01)
*H04W 68/02* (2009.01)

(58) Field of Classification Search
CPC . H04W 52/0229; H04W 4/70; H04W 68/005; H04W 72/0446; H04W 52/0216; H04W 72/046; H04W 68/025; H04W 28/0268; H04W 24/08; H04W 16/02; H04W 24/02; H04W 4/44; H04W 60/00; H04W 48/00; H04W 76/11; H04W 76/00; H04W 4/50; H04W 36/0066; H04W 36/0027
See application file for complete search history.

(56) References Cited

OTHER PUBLICATIONS

Qualcomm (Moderator), "Study on Artificial Intelligence (AI)/Machine Learning (ML) for NR Air Interface", 3GPP TSG RAN Meeting #94e, RP-213599, Electronic Meeting, Dec. 6-17, 2021 (6 pages).
Ericsson, "Revised WID on support of reduced capability NR devices", 3GPP TSG RAN Meeting #92e, RP-211574, Electronic Meeting, Jun. 14-18, 2021 (6 pages).
Ericsson (Moderator), "New WID on enhanced support of reduced capability NR devices", 3GPP TSG RAN meeting #94e, RP-212705, Electronic Meeting, Dec. 6-17, 2021 (4 pages).
Apple Inc., "[Draft] Summary of [AT116-e][105][RedCap] eDRX cycles aspects (Apple)—Phase 2", 3GPP TSG-RAN WG2 #116-e, R2-2111350, Electronic meeting, Nov. 1-12, 2021 (41 pages).
3GPP TR 38.875 V17.0.0 (Mar. 2021), 3rd Generation Partnership Project; Technical Specification Group Radio Access Network; Study on Support of reduced capability NR devices (Release 17), Mar. 2021 (135 pages).
3GPP TS 38.300 V16.8.0 (Dec. 2021), 3rd Generation Partnership Project; Technical Specification Group Radio Access Network; NR; NR and NG-RAN Overall Description; Stage 2 (Release 16), Dec. 2021 (152 pages).
3GPP TS 38.304 V16.7.0 (Dec. 2021), 3rd Generation Partnership Project; Technical Specification Group Radio Access Network; NR; User Equipment (UE) procedures in Idle mode and RRC Inactive state (Release 16), Dec. 2021 (39 pages).
3GPP TS 38.331 V16.7.0 (Dec. 2021), 3rd Generation Partnership Project; Technical Specification Group Radio Access Network; NR; Radio Resource Control (RRC) protocol specification (Release 16), Dec. 2021 (963 pages).
3GPP TS 23.501 V16.8.0 (2021-0), 3rd Generation Partnership Project; Technical Specification Group Services and System Aspects; System architecture for the 5G System (5GS); Stage 2 (Release 16), Mar. 2021 (451 pages).
3GPP TS 23.003 V17.4.0 (Dec. 2021), 3rd Generation Partnership Project; Technical Specification Group Core Network and Terminals; Numbering, addressing and identification; (Release 17), Dec. 2021 (146 pages).
3GPP TS 38.213 V17.0.0 (Dec. 2021), 3rd Generation Partnership Project; Technical Specification Group Radio Access Network; NR; Physical layer procedures for control (Release 17), Dec. 2021 (225 pages).
Zhu, H. et al., "Federated Learning on Non-IID Data: A Survey", Jun. 12, 2021 (29 pages).
McMahan, H. et al., "Communication-Efficient Learning of Deep Networks from Decentralized Data", Feb. 28, 2017 (11 pages).
International Search Report issued in International Application No. PCT/EP2023/077089 dated Dec. 21, 2023 (8 pages).
Azari, A. et al., "Energy and Resource Efficiency by User Traffic Prediction and Classification in Cellular Networks", IEEE Transactions On Green Communications and Networking, vol. 6, No. 2. Jun. 2022 (14 pages).

\* cited by examiner

DETERMINATION OF INACTIVE EDRX CONFIGURATIONS FOR USER EQUIPMENT

TECHNICAL FIELD

Embodiments presented herein relate to methods, a core network node, an access network node, computer programs, and a computer program product for determining INACTIVE extended discontinuous reception configurations for user equipment.

BACKGROUND

Three usage scenarios for fifth generation (5G) cellular technology are enhanced mobile broadband (eMBB) services, ultra-reliable low-latency communication (URLLC) services, and massive machine type communication (mMTC) services. In all these scenarios, a key importance is given to the energy consumption of the served user equipment (UEs). The targeted battery life for some types of UEs (such as industrial wireless sensors, video surveillance devices, wearables, etc.) is in the range of several years. In this regard, the energy consumption of UEs can be reduced by using discontinuous monitoring of the downlink. This can be achieved with techniques referred to as discontinuous reception (DRX) and extended DRX (eDRX). The idea behind DRX is that a UE can remain in a low power mode, or sleep state, for a configured DRX cycle length and is only required to monitor the downlink during a short activity time after each DRX cycle (during which the UE monitors the downlink for a limited number of timeslots or subframes). In some implementations of eDRX, the maximum cycle length is 10485.76 seconds for the radio resource control idle (RRC_IDLE) state and the maximum cycle length is 10.24 seconds for the radio resource control (RRC_INACTIVE) state as per Rel-17. In other implementations of eDRX the eDRX cycle length can be even longer (e.g., up to 10485.76 seconds) for the RRC_INACTIVE state. Longer eDRX cycles can enable battery life in the range of several years. However, downlink latency might get affected as the UE only monitors possible paging signals after the eDRX cycle. Reductions in battery consumption can be achieved when RRC_INACTIVE eDRX is used on top of RRC_IDLE eDRX because of reduced signaling between the network (such as from a gNB) and the UE. Further details of the eDRX cycle and paging cycle can be found in 3GPP TS 38.331 "NR; Radio Resource Control (RRC); Protocol specification", version 17.2.0. Further details of paging monitoring can be found in 3GPP TS 38.304 "NR; User Equipment (UE) procedures in idle mode and in RRC Inactive state", version 17.2.0.

A UE can operate with eDRX if the UE has negotiated an eDRX configuration with upper layers (such as non-access stratum (NAS) signaling) and/or RRC, and the serving gNB indicates support for eDRX (for example as broadcast system information). When the eDRX configuration has been negotiated over NAS, the gNB is informed about the eDRX cycle length and paging time window configuration for the UE. The RRC layer can then utilize eDRX, which cannot have its maximum cycle length longer than the NAS configured eDRX cycle. The RRC layer does not inform the upper layers of its eDRX configuration, and, in turn, from the NAS point-of-view the UE is always connected to the gNB. However, from the gNB RAN point-of-view the UE can be in an INACTIVE state and then only be paged after the configured eDRX cycle by so called radio access network paging. This will lead to increased latency. Since several UEs can request for eDRX configuration from both the upper layers and RRC, a tradeoff should be maintained between the UE access latency and eDRX cycles.

In further detail, the core network will configure parameters for IDLE eDRX whilst the gNB will configure parameters for INACTIVE eDRX (up to the length of IDLE eDRX). Further, the core network will inform the gNB of the IDLE eDRX configuration, but the gNB will not inform the core network of the INACTIVE eDRX configuration. This leads to a distributed setting of eDRX, where the INACTIVE eDRX configuration is not shared with any other network entity. Therefore, if a gNB intends to optimize the tradeoff between power saving and downlink latency, the gNB can perform such optimization locally. However global optimization of this tradeoff will require sharing of INACTIVE eDRX configurations used by different gNBs with a centralized entity, which is not the case. Global optimization of INACTIVE eDRX configurations is therefore not possible, and thus the tradeoff between latency and power saving is not addressed efficiently.

Hence, there is still a need for an improved setting of eDRX configurations for a UE.

SUMMARY

An object of embodiments herein is to address the above issues to enable improved setting of eDRX configurations for a UE.

An object of embodiments herein is enable eDRX configurations to be provided for support of low-powered UEs.

According to a first aspect there is presented a method for determining INACTIVE eDRX configurations for UEs. The method is performed by a core network node. The method comprises performing an iterative learning process with the access network nodes to determine the INACTIVE eDRX configurations. The iterative learning process for iterations t=1, 2, . . . comprises transmitting a global parameter vector $\theta_t^*$ of a machine learning model to the access network nodes for determining the INACTIVE eDRX configurations of the UEs. The global parameter vector $\theta_t^*$ defines coefficients for the machine learning model for iteration t. The iterative learning process for iterations t=1, 2, . . . comprises receiving local model parameter vectors $\theta_{t+1}^{(k)}$, where k=1, . . . , K, with locally updated coefficients for the machine learning model from the access network nodes. The iterative learning process for iterations t=1, 2, . . . comprises updating the global parameter vector $\theta_t^*$ for iteration t+1 as a function of all received local model parameter vectors $\theta_{t+1}^{(k)}$ until a stopping criterion is fulfilled.

According to a second aspect there is presented a core network node for determining INACTIVE eDRX configurations for UEs. The core network node comprises processing circuitry. The processing circuitry is configured to cause the core network node to perform an iterative learning process with the access network nodes to determine the INACTIVE eDRX configurations. The processing circuitry is configured to cause the core network node to, as part of performing the iterative learning process for iterations t=1, 2, . . . , transmit a global parameter vector $\theta_t^*$ of a machine learning model to the access network nodes for determining the INACTIVE eDRX configurations of the UEs. The global parameter vector $\theta_t^*$ defines coefficients for the machine learning model for iteration t. The processing circuitry is configured to cause the core network node to, as part of performing the iterative learning process for iterations t=1, 2, . . . , receive local model parameter vectors $\theta_{t+1}^{(k)}$, where k=1, . . . , K, with locally updated coefficients for the machine learning model from the access network nodes. The processing circuitry is configured to cause the core network node to, as part of performing the iterative learning process for iterations t=1, 2, . . . , update the global parameter vector $\theta_t^*$ for iteration t+1 as a function of all received local model parameter vectors $\theta_{t+1}^{(k)}$ until a stopping criterion is fulfilled.

According to a third aspect there is presented a computer program for determining INACTIVE eDRX configurations for UEs. The computer program comprises computer code which, when run on processing circuitry of a core network node, causes the core network node to perform a method according to the first aspect.

According to a fourth aspect there is presented a method for determining INACTIVE eDRX configurations for UEs. The method is performed by an access network node. The method comprises performing an iterative learning process with the core network node to determine the INACTIVE eDRX configurations. The iterative learning process for iterations t=1, 2, . . . comprises receiving a global parameter vector $\theta_t^*$ of a machine learning model from the core network node. The global parameter vector $\theta_t^*$ defines coefficients for the machine learning model for iteration t. The iterative learning process for iterations t=1, 2, . . . comprises iteratively updating the machine learning model with local data as input and coefficients defined by the global parameter vector $\theta_t^*$ to determine the INACTIVE eDRX configurations of the UEs. The iterative learning process for iterations t=1, 2, . . . comprises updating a local model parameter vector $\theta_{t+1}^{(k)}$ based on the determining INACTIVE eDRX configurations. The iterative learning process for iterations t=1, 2, . . . comprises transmitting the updated local model parameter vector t to the core network node. The iterative learning process for iterations t=1, 2, . . . comprises providing the INACTIVE eDRX configurations to the UEs.

According to a fifth aspect there is presented an access network node for determining INACTIVE eDRX configurations for UEs. The access network node comprises processing circuitry. The processing circuitry is configured to cause the access network node to perform an iterative learning process with the core network node to determine the INACTIVE eDRX configurations. The processing circuitry is configured to cause the access network node to, as part of performing the iterative learning process for iterations t=1, 2, . . . , receive a global parameter vector $\theta_t^*$ of a machine learning model from the core network node. The global parameter vector $\theta_t^*$ defines coefficients for the machine learning model for iteration t. The processing circuitry is configured to cause the access network node to, as part of performing the iterative learning process for iterations t=1, 2, . . . , iteratively update the machine learning model with local data as input and coefficients defined by the global parameter vector $\theta_t^*$ to determine the INACTIVE eDRX configurations of the UEs. The processing circuitry is configured to cause the access network node to, as part of performing the iterative learning process for iterations t=1, 2, . . . , update a local model parameter vector $\theta_{t+1}^{(k)}$ based on the determining INACTIVE eDRX configurations. The processing circuitry is configured to cause the access network node to, as part of performing the iterative learning process for iterations t=1, 2, . . . , transmit the updated local model parameter vector $\theta_{t+1}^{(k)}$ to the core network node. The processing circuitry is configured to cause the access network node to, as part of performing the iterative learning process for iterations t=1, 2, . . . , provide the INACTIVE eDRX configurations to the UEs.

According to a sixth aspect there is presented a computer program for determining INACTIVE eDRX configurations for UEs. The computer program comprises computer code which, when run on processing circuitry of an access network node, causes the access network node to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously, these aspects provide improved settings of eDRX configurations for UEs served by the access network nodes.

Advantageously, these aspects enable eDRX configurations to be provided for support of low-powered UEs to be served by the access network nodes.

Advantageously, these aspects can be used to maximize UE power savings by optimally selecting the eDRX configurations.

Advantageously, these aspects enable decentralized eDRX configuration selection, whilst maximizing a global network objective.

Advantageously, these aspects enable the eDRX configurations to be determined whilst not exposing training data outside each access network node, thus fulfilling data privacy and security requirements.

Advantageously, these aspects provide computationally efficient, deployment efficient, and operational, efficient determination of eDRX configurations.

Advantageously, these aspects enable the eDRX configurations to be dynamically determined for each access network node.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
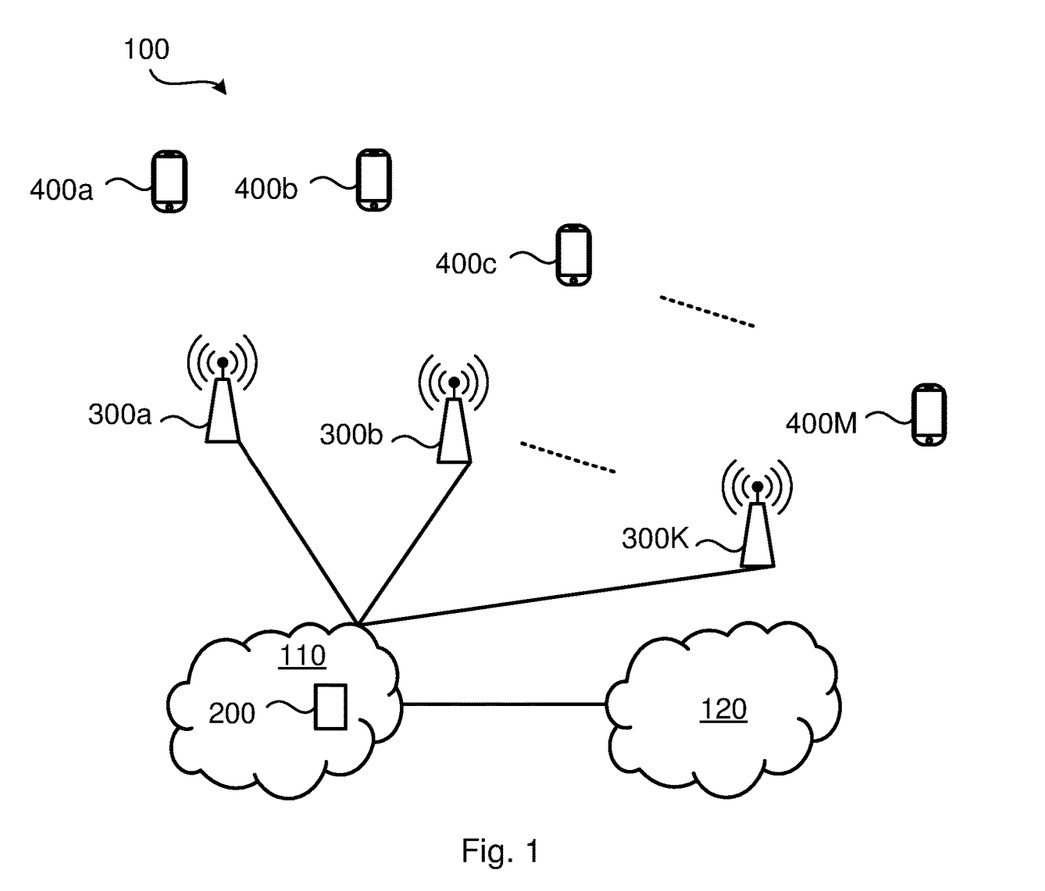
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth (5G) telecommunications network, a sixth (6G) telecommunications network, and support any 3GPP telecommunications standard. The communication network 100 comprises access network nodes 300a:300K configured to provide network access to UEs 400a:400M. Non-limiting examples of access network nodes 300a:300K are radio access network nodes, radio base stations, base transceiver stations, node Bs, evolved node Bs, gNBs, access point, access node, and integrated access and backhaul nodes. The access network nodes 300a:300K are operatively connected to a core network 110. The core network comprises functions, entities, and devices, as represented by a core network node 200. In some examples the core network node 200 is an Access and Mobility management Function (AMF) node. In other examples, the core network node 200 is a Network Data Analytic Function (NWDAF) node. In turn, the core network node 200 is operatively connected to a wide area service network 120, such as the Internet. The UEs 400a:400M are thereby enabled to access services of, and exchanged data with, the wide area service network 120.

As noted above, the radio access nodes 300a:300K configure the INACTIVE eDRX and the core network node 200 configures the IDLE eDRX for the UEs 400a:400M. Further, the core network node 200 provides its eDRX configuration to the radio access nodes 300a:300K, such that the radio access nodes 300a:300K can configure the INACTIVE eDRX cycle up to the IDLE eDRX cycle. But the radio access nodes 300a:300K do not inform the core network node 200 about the determined INACTIVE eDRX cycles. This makes it impossible for the core network node 200 and the radio access nodes 300a:300K to jointly optimize the eDRX cycles. Similarly, there is no coordination mechanism available for inter-radio access node coordination. Still further, even if this would be possible, issues such as data privacy can arise in a multi-vendor deployment, where the core network node 200 is from one vendor, and the radio access nodes 300a:300K are from another vendor.

The embodiments disclosed herein therefore relate to techniques for determining INACTIVE eDRX configurations for UEs 400a:400M that can address these issues. Particularly, the herein disclosed embodiments relate to techniques that could enable determination of optimal INACTIVE eDRX configurations for UEs 400a:400M without compromising on security or privacy, and without the radio access nodes 300a:300K needing to inform the core network node 200 about the determined INACTIVE eDRX cycles. In order to obtain such techniques, there is provided a core network node 200, a method performed by the core network node 200, a computer program product comprising code, for example in the form of a computer program, that when run on processing circuitry of the core network node 200, causes the core network node 200 to perform the method. In order to obtain such techniques, there is further provided an access network node 300k, a method performed by the access network node 300k, and a computer program product comprising code, for example in the form of a computer program, that when run on processing circuitry of the access network node 300k, causes the access network node 300k to perform the method.

In essence, the herein disclosed embodiments are based on using an iterative learning process, such as in a federated learning framework, where the core network node 200 iteratively (in global iteration rounds) updates a global model and provides its parameters to the access network nodes 300a:300K, and where each of the access network nodes 300a:300K iteratively (in local iteration rounds) updates its own local model that is based on the parameters of the global model, and feed parameters of the locally updates models back to the core network node 200 for update of the global model for the next global iteration round. This enables coordinated and optimized determination of INACTIVE eDRX configurations (as well as IDLE eDRX configurations) for the UEs 400a:400M that can maximize the power savings in the UEs 400a:400M. Since only model parameters are exchanged between the core network node 200 and the access network nodes 300a:300K such coordinated and optimized determination can be achieved without violating any data privacy or security requirements and without the radio access nodes 300a:300K needing to inform the core network node 200 about the determined INACTIVE eDRX cycles.

Figure 2:
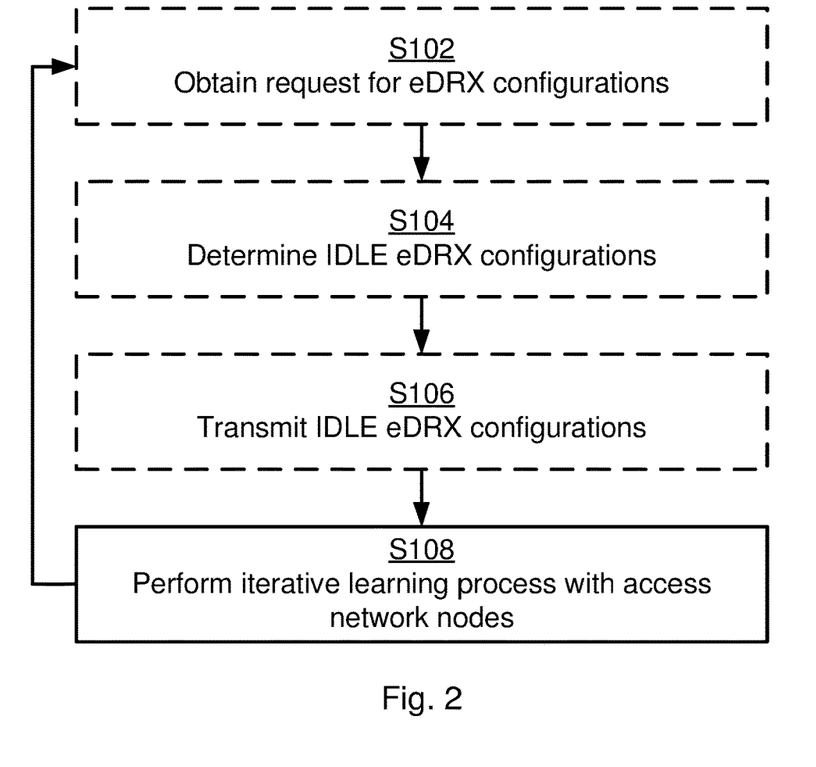
FIGS. 2, 3, 4, and 5 are flowcharts of methods according to embodiments.
Figure 3:
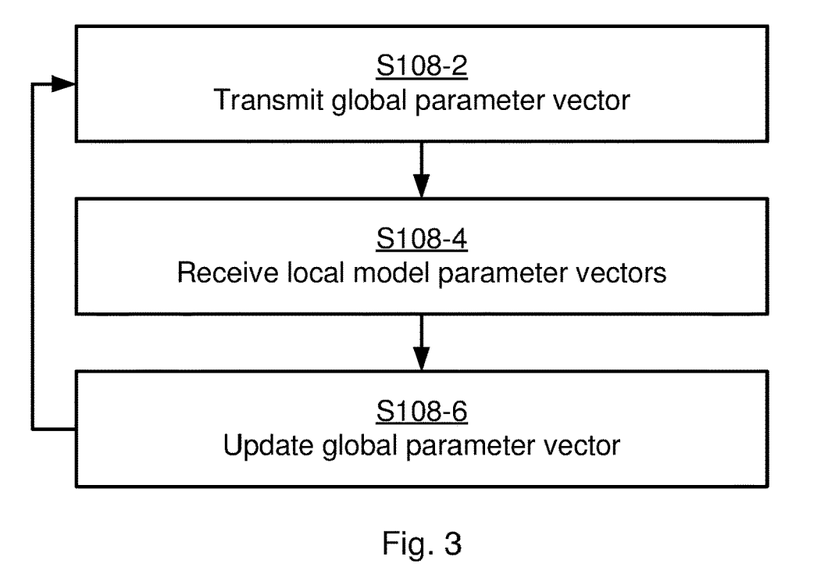

Reference is now made to FIG. 2 and FIG. 3 illustrating a method for determining INACTIVE eDRX configurations for UEs 400a:400M as performed by the core network node 200 according to an embodiment.

S108: The core network node 200 performs an iterative learning process with the access network nodes 300a:300K to determine the INACTIVE eDRX configurations.

The iterative learning process for iterations t=1, 2, . . . comprises actions S108-2, S108-4, S108-6, as disclosed in FIG. 3.

S108-2: The core network node 200 transmits a global parameter vector $\theta_t^*$ of a machine learning model to the access network nodes 300a:300K for determining the INACTIVE eDRX configurations of the UEs 400a:400M. The global parameter vector $\theta_t^*$ defines coefficients for the machine learning model for iteration t.

S108-4: The core network node 200 receives local model parameter vectors $\theta_{t+1}^k$, where k=1, . . . , K, with locally updated coefficients for the machine learning model from the access network nodes 300a:300K.

S108-6: The core network node 200 updates the global parameter vector $\theta_t^*$ for iteration t+1 as a function of all received local model parameter vectors $\theta_{t+1}^k$ until a stopping criterion is fulfilled.

Embodiments relating to further details of determining INACTIVE eDRX configurations for UEs 400a:400M as performed by the core network node 200 will now be disclosed with continued reference to FIG. 2.

The stopping criterion in S108-6 in some non-limiting examples can be when a pre-determined number of iterations have been reached or when the global parameter vector differs less than a threshold value from one iteration to the next.

There could be different examples of INACTIVE eDRX parameters. In some non-limiting examples, the INACTIVE eDRX parameters pertain to any, or any combination of: INACTIVE eDRX cycle length, INACTIVE eDRX Paging Time Window length, number of total paging frames per eDRX cycle, number of paging occasions for a paging frame, start of the INACTIVE eDRX Paging Time Window, end of the INACTIVE eDRX Paging Time Window.

There could be different examples of global model parameter vector. In some embodiments, the global model parameter vector is composed of neural network weights of the machine learning model.

There could be different ways to update the global parameter vector $\theta_t^*$ for iteration t+1. In some embodiments, the global parameter vector $\theta_t^*$ for iteration t+1 is updated by aggregating and averaging all the received local model parameter vectors $\theta_{t+1}^k$.

In some aspects the core network node 200 can be regarded as assisting the access network nodes 400a:400K in the determination of the INACTIVE eDRX configurations for the UEs 400a:400M. Further, the core network node 200 might also determine IDLE eDRX configurations for the UEs 400a:400M and hence be configured to perform (optional) steps S104, S106.

S104: The core network node 200 determines IDLE eDRX configurations for the UEs 400a:400M.

S106: The core network node 200 transmits the IDLE eDRX configurations to access network nodes 300a: 300K serving the UEs 400a:400M.

In some aspects, the IDLE eDRX configurations are determined upon the core network node 200 having received a request for eDRX configurations from at least one of the UEs 400a:400M. Hence, the core network node 200 might be configured to perform (optional) step S102.

S102: The core network node 200 obtaining S102 a request for eDRX configurations from at least one of the UEs 400a:400M. The IDLE eDRX configurations can then be determined and/or the iterative learning process can then be determined for the UEs 400a:400M in response thereto.

There could be different examples of IDLE eDRX parameters. In some non-limiting examples, the IDLE eDRX parameters pertain to any, or any combination of: IDLE eDRX cycle length, IDLE eDRX Paging Time Window length, number of total paging frames per eDRX cycle, number of paging occasions for a paging frame, start of the IDLE eDRX Paging Time Window, end of the IDLE eDRX Paging Time Window.

In some aspects, not all the access network nodes that are operatively connected to the core network node 200 participate in the iterative learning process. That is, in some embodiments, the core network node 200 is operatively connected to a set of access network nodes and the iterative learning process is performed only with a subset composed of K of all the access network nodes in the set of access network nodes.

There could be different ways in in which the core network node 200 selects the subset of access network nodes to participate in the iterative learning process. In some non-limiting examples, which of all the access network nodes to include in the subset composed of K access network nodes is determined as a function of any, or any combination of: channel conditions, capability, locations, UE connectivity status, availability of communication resources, availability of computational resources, of the access network nodes.

Figure 4:
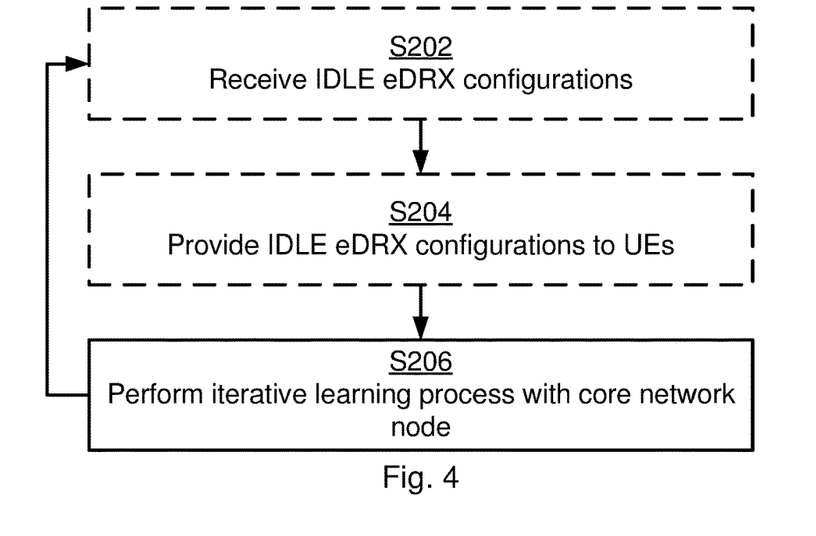
Figure 5:
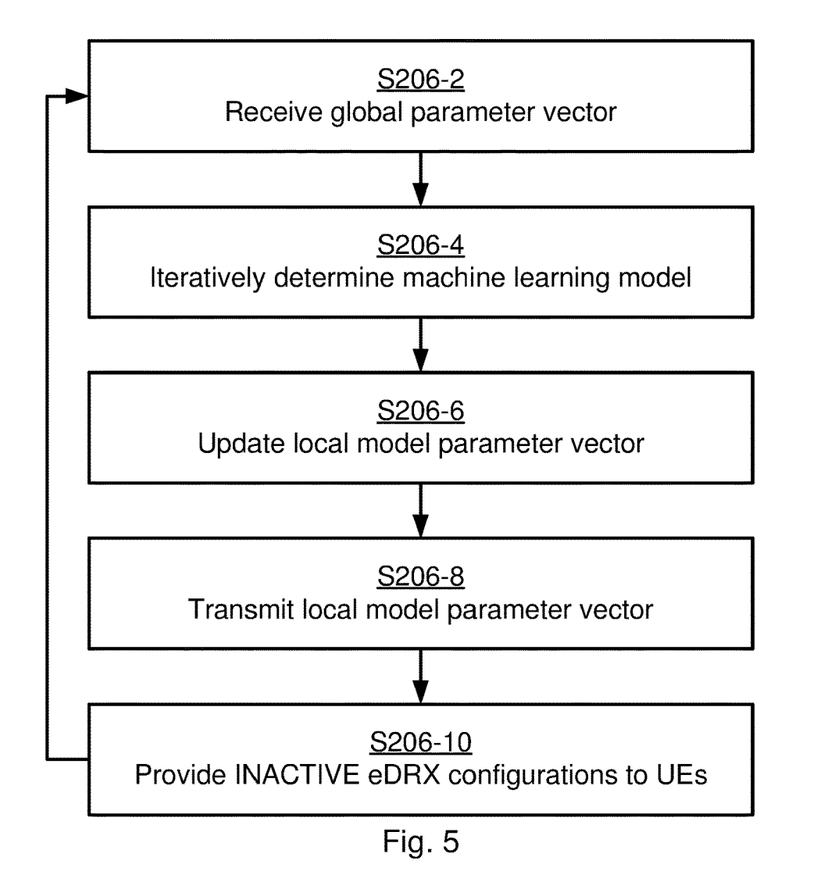

Reference is now made to FIG. 4 and FIG. 5 illustrating a method for determining INACTIVE eDRX configurations for UEs 400a:400M as performed by the access network node 300k according to an embodiment.

S206: The access network node 300k performs an iterative learning process with the core network node 200 to determine the INACTIVE eDRX configurations.

The iterative learning process for iterations t=1, 2, . . . comprises actions S206-2, S206-4, S206-6, S206-8, and S206-10, as disclosed in FIG. 5.

S206-2: The access network node 300k receives a global parameter vector $\theta_t^*$ of a machine learning model from the core network node 200. The global parameter vector $\theta_t^*$ defines coefficients for the machine learning model for iteration t.

S206-4: The access network node 300k iteratively updates the machine learning model with local data as input and coefficients defined by the global parameter vector $\theta_t^*$ to determine the INACTIVE eDRX configurations of the UEs 400a:400M.

S206-6: The access network node 300k updates a local model parameter vector $\theta_{t+1}^k$ based on the determining INACTIVE eDRX configurations.

S206-8: The access network node 300k transmits the updated local model parameter vector $\theta_{t+1}^k$ to the core network node 200.

S206-10: The access network node 300k provides the INACTIVE eDRX configurations to the UEs 400a: 400M.

Embodiments relating to further details of determining INACTIVE eDRX configurations for UEs 400a:400M as performed by the access network node 300k will now be disclosed with continued reference to FIG. 4.

The machine learning model might in S206-4 be iteratively performed until a stopping criterion is fulfilled. The stopping criterion in S206-4 in some non-limiting examples can be when a pre-determined number of iterations have been reached or when the output from the machine learning model differs less than a threshold value from one iteration to the next.

As disclosed above, the core network node 200 might determine IDLE eDRX configurations for the UEs 400a: 400M. The IDLE eDRX configurations of the UEs served by the access network node 300k are received by the access network node 300k and forwarded to its served UEs. Therefore, in some embodiments, the access network node 300k is configured to perform (optional) steps S202, S204.

S202: The access network node 300k receives IDLE eDRX configurations from the core network node 200.

S204: The access network node 300k provides the IDLE eDRX configurations to the UEs 400a:400M.

There could be different examples of local data used by the access network node 300k when iteratively updating the machine learning model. In some non-limiting examples, the local data pertains to any, or any combination of: IDLE eDRX cycle length, IDLE eDRX Paging Time Window length, number of total paging frames in eDRX cycle, number of paging occasions for a paging frame, start of the IDLE eDRX Paging Time Window, end of the IDLE eDRX Paging Time Window.

There could be different examples of local model parameter vector. In some embodiments, the local model parameter vector is composed of neural network weights of the machine learning model.

In some aspects, the machine learning model is designed with a goal to minimize a loss function that represents the extra energy used for paging, such as when the radio access network node 300k needs to page a UE due to a lower eDRX cycle, and considers the downlink latency of accessing the UE due to the use of eDRX. In particular, in some embodiments, the machine learning model comprises minimizing a loss function that represents extra energy used for the access network node 300k to page one of the UEs 400a:400M, due to a lowering an eDRX cycle, and that considers downlink latency of accessing the UEs 400a:400M due to eDRX operation.

In some aspects, the output of the machine learning model is a soft decision which indicates the probability of one or more INACTIVE eDRX configurations for a UE served by the access network node 300k. That is, in some embodiments, the machine learning model as output provides a vector of probabilities for different INACTIVE eDRX configurations for the UEs 400a:400M, and which INACTIVE eDRX configurations to be provided to the UEs 400a:400M are determined from the vector of probabilities.

Further aspects of the iterative learning process as applicable to any of the above disclosed embodiments, aspects, and examples will be disclosed hereinafter.

In general terms, one global iteration of the iterative learning process can be summarized as follows. Assume that there is a set of K access network nodes 300a:300K and dataset D representing eDRX configurations for the UEs 400a:400M. At the beginning of each global iteration round, the core network node 200 selects a subset S of the access network node 300a:300K. Having an optimal selection of access network nodes 300a:300K participating in one global iteration of the iterative learning process can lead to fast convergence and maximum reward. The selection of access network nodes 300a:300K can be based on several criteria i.e., their channel conditions, capability, locations, UE connectivity status, availability of communication/computational resources, etc. The selected subset of the access network nodes 300a:300K is then provided with global parameters w that, for example, represent the neural network weights. The access network nodes 300a:300K perform prediction based on the global parameters and its local dataset, and perform an update to the initialized model. The access network nodes 300a:300K then share the updated local models with the core network node 200, which compute an aggregate of the model parameters, and shares it back with the access network nodes 300a:300K. The process repeats itself until a convergence point is reached.

The dataset D is partitioned over access network nodes 300a:300K such that $D^k$ is the dataset of access network node k and $n^k$ is the size of dataset $D^k$, and $$n = \Sigma_{k=1}^{C} n^k$$

is the size of the entire dataset, where C is the fraction of participating access network nodes 300a:300K. The dataset comprises the input $x_i$ which are the parameters the access network nodes 300a:300K needs to consider for enabling INACTIVE eDRX for UE i, and the output is $y_i$ which represents the INACTIVE eDRX configuration for UE i.

A loss function $f(\cdot)$ defines the error of prediction $\hat{y}_i - y_i$, where $\hat{y}_i$ is the optimal INACTIVE eDRX configuration for input $x_i$, which will lead to maximum power saving and minimum downlink latency. One objective could therefore be to minimize the loss function $f(\cdot)$ by optimizing the global parameters θ. In general terms, the optimization of a non-convex neural network utility (no considering time) can be formulated as:

$$\min_\theta f(\theta) = \frac{1}{n} \sum_{i=1}^{n} f^k(\theta^k)$$

Likewise. the loss function for access network node k (no considering time) can be formulated as $$f_k(\theta^k) = \frac{1}{n^k} \sum_{i=1}^{n^k} l(x_i, y_i; \theta^k)$$

The loss function for access network node k represents the extra energy used for paging by access network node k, when access network node k needs to page a UE due to a lower eDRX cycle. Also, the loss function considers the downlink latency of accessing the UE due to eDRX. A lower value of the loss function will result in small difference between the optimal eDRX cycle and the predicted eDRX cycle (i.e., few paging messages more than the optimal with higher downlink latency), and a higher value of the loss function results in large difference of eDRX cycle (i.e., higher number of paging messages than the optimal with lower downlink latency).

The above formulation can now be re-written for the fraction C of participating access network nodes 300a:300K in the current global iteration of the iterative learning process optimization scenario (no considering time) as:

$$\min_{w\theta} f(\theta) = \sum_{k=1}^{C \cdot K} \frac{n^k}{n} f^k(\theta^k)$$

The output is a set of optimal INACTIVE eDRX configurations for the UEs of the participating access network nodes 300a:300K. These INACTIVE eDRX configurations will minimize the tradeoff between network wide energy consumption and downlink latency.

Figure 6:
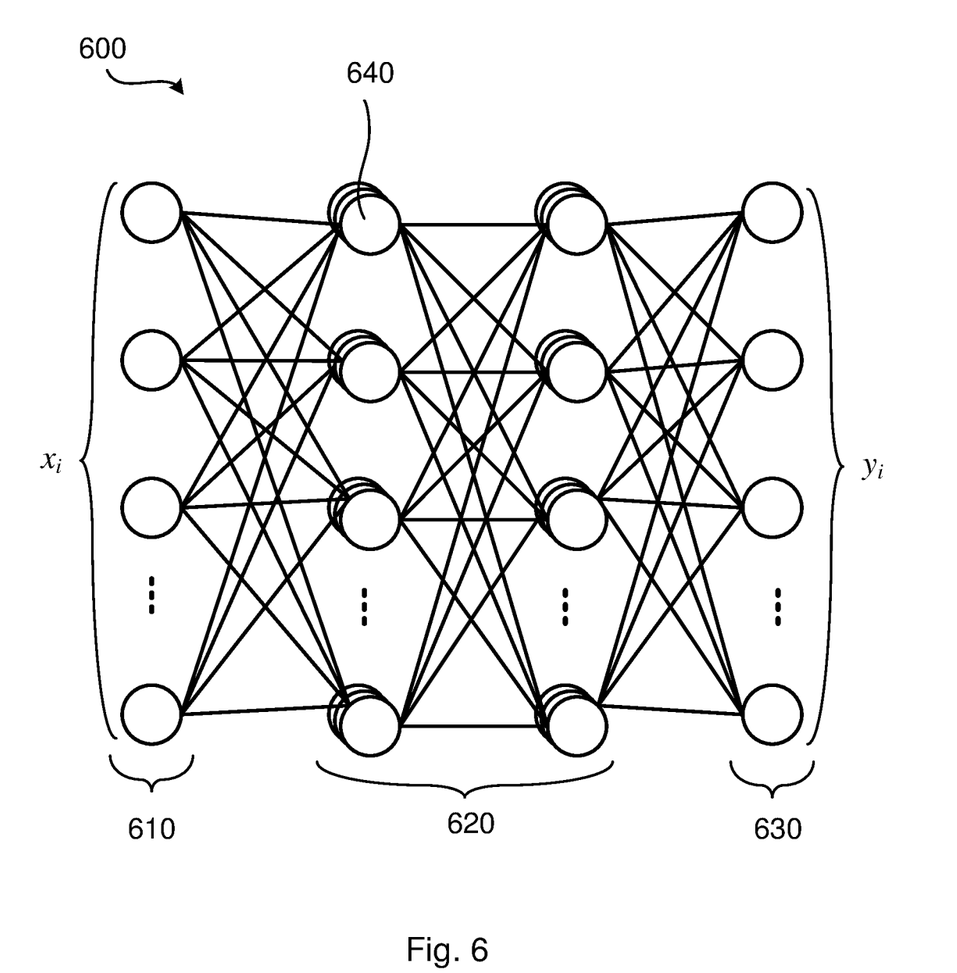
FIG. 6 is a schematic illustration of a machine learning model according to embodiments.

In some examples, each access network node 300a:300K implements a machine learning model in terms of a deep neural network (DNN) which uses some fully connected layers. One example of a machine learning model 600 implemented as a DNN with four fully connected layers is shown in FIG. 6. The input parameters $x_i$ are fed into the first fully connected input layer 610. The result from the input layer is passed on to one or more fully connected hidden layers 620. In FIG. 6 there are two such fully connected hidden layers. The aggregated data is passed on to the output layer 630. All the layers are composed of neurons 640. All layers use rectified linear activation unit (ReLU) activation except the output layer, which uses softmax activation. The output $y_i$ is a soft decision which indicates the probability of INACTIVE eDRX configuration for a UE of an access network node.

At the end of every time frame t, each participating access network node k updates (i.e., trains) its local model (e.g., in terms of neural network weights) $\theta_t^k$ based on its local experiences, by performing a gradient descent step on $\theta_t^k$:

$$\theta_{t+1}^k = \theta_t^k + \alpha \Sigma_t^{T-1} \log \pi_k(I_t^k, x_t^k) A^\pi(I_t^k, x_t^k),$$

where α is the learning rate of the access network node and $A^\pi(I_t^k, x_t^k)$ is an estimate of the advantage function when following policy $\pi_k$. The policy parameter update specifies the direction to increase the probability distribution $\pi_k$, where it effects to reinforce action that leads to minimum loss.

Each participating access network node k then shares the locally updated model with the core network node 200. The core network node 200 can then update the global model by aggregating all received locally updated models:

$$\theta_t^* = \frac{1}{C}\sum_{k=1}^{C \cdot K} \theta_t^k$$

where $\theta_t^*$ is the global model updated by the core network node 200 for global iteration t.

Then, the thus updated global model is broadcast $\theta_t^*$ to the access network node 300a:300K for the nest global iteration t.

The training data of the participating access network nodes 300a:300K thus share the same feature space (e.g., in terms of the global model updated by the core network node 200) but have different sample space (e.g., in terms of number of served UEs). Some iterative learning approaches assume that the whole system (i.e., the core network node and the participating access network nodes) can have only one global model, and that the access network nodes observe heterogeneous data. In contrast from a centralized learning approaches, a federated learning approach maintains data privacy, as only the global model parameters and the locally updated model parameters are communicated between the access network nodes 300a:300K and the core network node 200, whilst the training data itself remains at each access network node without being exposed to the core network node 200.

Figure 7:
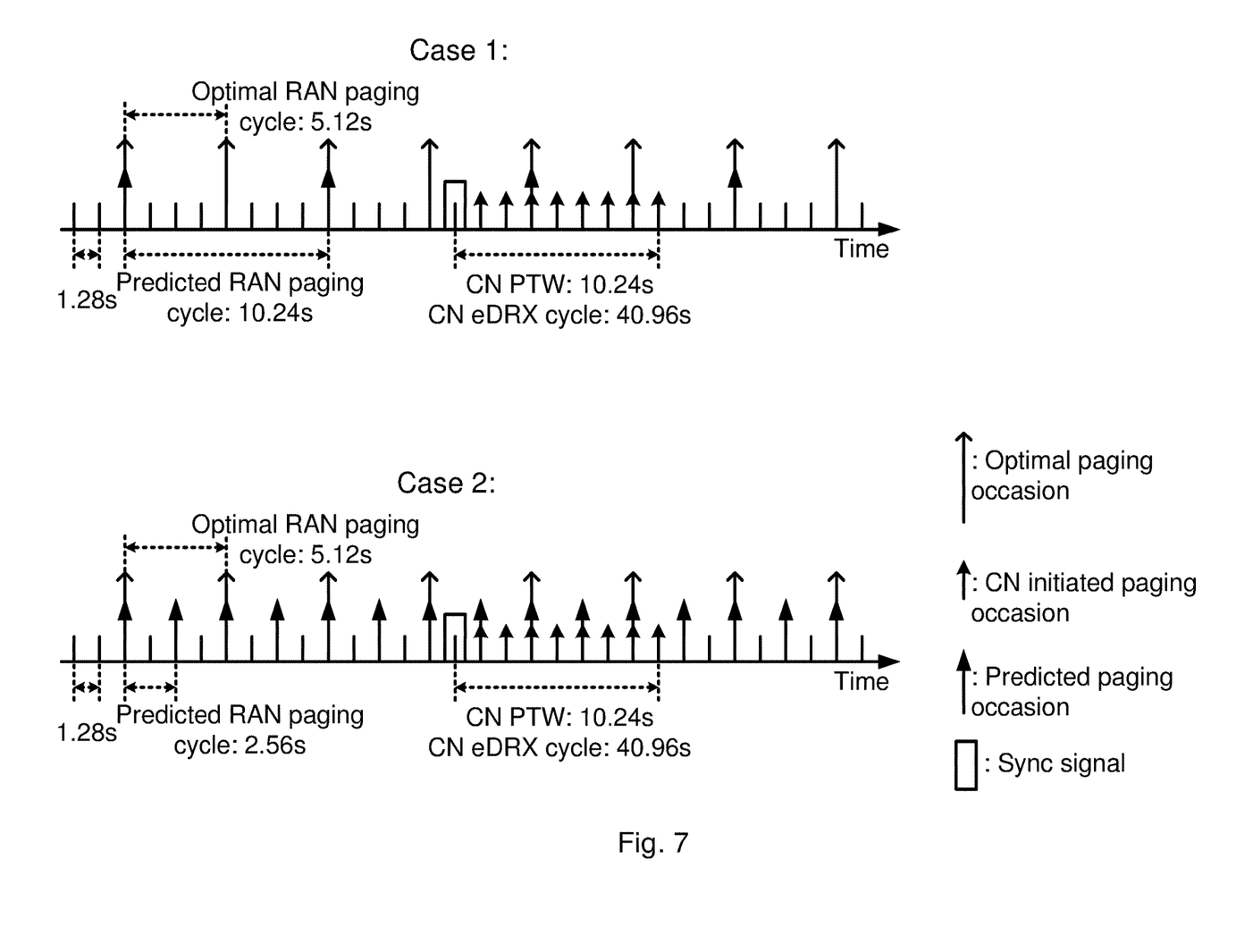
FIG. 7 is a schematic illustration of two examples of eDRX configurations according to embodiments.

Two illustrative examples will be disclosed next with reference to FIG. 7. In FIG. 7 is illustrated two cases for configuration of eDRX for a UE in RRC_INACTIVE mode, where the UE is configured by the core network node 200 with parameters for IDLE eDRX and by its serving access network node 300k with parameters for INACTIVE eDRX. In both cases the length of the Paging Time Window (PTW) is 10.24 seconds and the eDRX cycle length is 40.96 seconds. Here, the optimal RAN paging cycle will give the most power saving and guarantee a minimum downlink access latency. In the first case ("Case 1") the predicted RAN paging cycle (10.24 seconds) is longer than the optimal paging cycle (5.12 seconds), The paging occasions are thereby reduced and the downlink access latency is increased. In the second case ("Case 2") the predicted RAN paging cycle (2.56 seconds) is shorter than the optimal paging cycle (5.12 seconds). The number of paging occasions is thereby increased and the downlink access latency is decreased.

Figure 8:
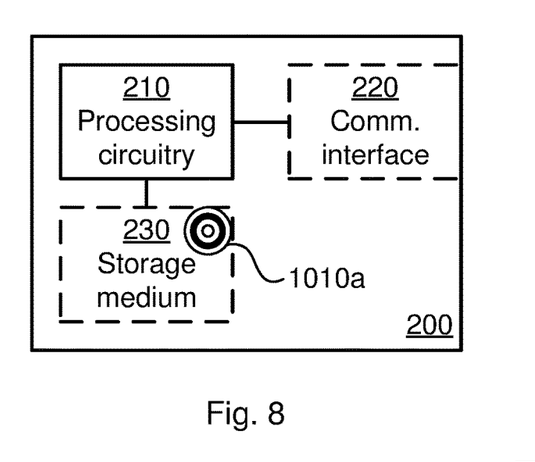
FIG. 8 is a schematic diagram showing functional units of a core network node according to an embodiment.

FIG. 8 schematically illustrates, in terms of a number of functional units, the components of a core network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the core network node 200 to perform a set of operations, or steps, as disclosed above. For example, the storage medium 230 may store the set of operations, and the processing circuitry 210 may be configured to retrieve the set of operations from the storage medium 230 to cause the core network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The core network node 200 may further comprise a communications (comm.) interface 220 for communications with other entities, functions, nodes, and devices, as in FIG. 1. As such the communications interface 220 may comprise one or more transmitters and receivers, comprising analogue and digital components.

The processing circuitry 210 controls the general operation of the core network node 200 e.g. by sending data and control signals to the communications interface 220 and the storage medium 230, by receiving data and reports from the communications interface 220, and by retrieving data and instructions from the storage medium 230. Other components, as well as the related functionality, of the core network node 200 are omitted in order not to obscure the concepts presented herein.

Figure 9:
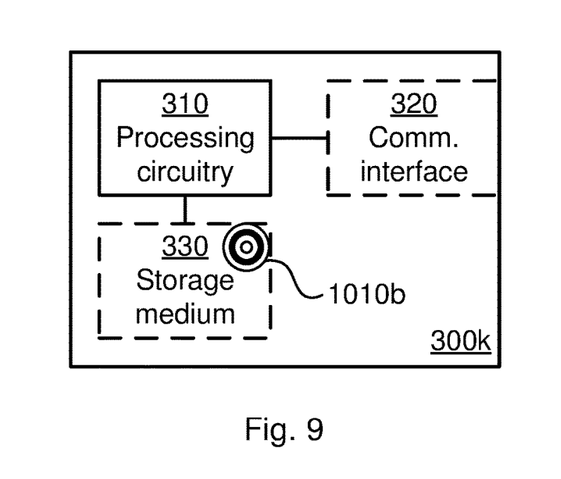
FIG. 9 is a schematic diagram showing functional units of an access network node according to an embodiment.

FIG. 9 schematically illustrates, in terms of a number of functional units, the components of an access network node 300k according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the access network node 300k to perform a set of operations, or steps, as disclosed above. For example, the storage medium 330 may store the set of operations, and the processing circuitry 310 may be configured to retrieve the set of operations from the storage medium 330 to cause the access network node 300k to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The access network node 300k may further comprise a communications interface 320 for communications with other entities, functions, nodes, and devices, as in FIG. 1. As such the communications interface 320 may comprise one or more transmitters and receivers, comprising analogue and digital components.

The processing circuitry 310 controls the general operation of the access network node 300k e.g. by sending data and control signals to the communications interface 320 and the storage medium 330, by receiving data and reports from the communications interface 320, and by retrieving data and instructions from the storage medium 330. Other components, as well as the related functionality, of the access network node 300k are omitted in order not to obscure the concepts presented herein.

The core network node 200 and/or the access network node 300k may be provided as a standalone device or as a part of at least one further device. Alternatively, functionality of the core network node 200 and/or the access network node 300k may be distributed between at least two devices, or nodes. Thus, a first portion of the instructions performed by the core network node 200 and/or the access network node 300k may be executed in a first device, and a second portion of the instructions performed by the core network node 200 and/or the access network node 300k may be executed in a second device; the herein disclosed embodiments are not limited to any particular number of devices on which the instructions performed by the core network node 200 and/or the access network node 300k may be executed. Hence, the methods according to the herein disclosed embodiments are suitable to be performed in a cloud computational environment. Therefore, although a single processing circuitry 210, 310 is illustrated in FIGS. 8 and 9 the processing circuitry 210, 310 may be distributed among a plurality of devices, or nodes. The same applies to the computer programs 1020a, 1020b of FIG. 10.

Figure 10:
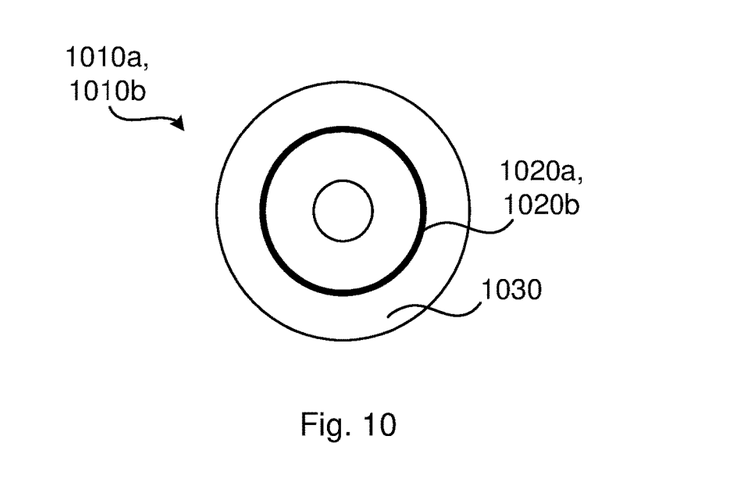
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the core network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the access network node 300k as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in anyway which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining an INACTIVE extended discontinuous reception (eDRX) configuration for user equipments (UEs) and performed by a core network node, wherein the method comprises:
    transmitting to a plurality of network nodes a first global parameter vector of a machine learning model for determining the INACTIVE eDRX configuration of the UEs, wherein the first global parameter vector defines coefficients for the machine learning model, wherein the plurality of network nodes comprises a first network node and a second network node;
    receiving from the first network node a first local model parameter vector with locally updated coefficients for the machine learning model;
    receiving from the second network node a second local model parameter vector with locally updated coefficients for the machine learning model;
    producing a second global parameter vector using the first local model parameter vector and the second local model parameter vector;
    determining whether a stopping criterion is fulfilled; and
    if the stopping criterion is not fulfilled, transmitting the second global parameter vector to the plurality of network nodes, wherein
    determining whether the stopping criterion is fulfilled comprises: 1) comparing the first global parameter vector and the second global parameter vector and/or 2) determining whether a counter value satisfies a condition.

2. The method of claim 1, wherein INACTIVE eDRX parameters of the INACTIVE eDRX configuration pertain to an INACTIVE eDRX cycle length, an INACTIVE eDRX Paging Time Window length, a number of total paging frames per eDRX cycle, a number of paging occasions for a paging frame, a start of the INACTIVE eDRX Paging Time Window, or an end of the INACTIVE eDRX Paging Time Window.

3. The method of claim 1, wherein the first global parameter comprises neural network weights of the machine learning model.

4. The method of claim 1, wherein the second global parameter vector is produced by aggregating and averaging using the first local model parameter vector and the second local model parameter vector.

5. The method of claim 1, wherein the method further comprises:
    determining IDLE eDRX configurations for the UEs; and
    transmitting the IDLE eDRX configurations to a network node serving the UEs.

6. The method of claim 5, wherein the method further comprises:
    obtaining a request for eDRX configurations from at least one of the UEs, and wherein the first global parameter is transmitted to the plurality of network nodes in response to receiving obtaining the request.

7. The method of claim 5, wherein IDLE eDRX parameters of the IDLE eDRX configurations pertain to an IDLE eDRX cycle length, an IDLE eDRX Paging Time Window length, a number of total paging frames per eDRX cycle, a number of paging occasions for a paging frame, a start of the IDLE eDRX Paging Time Window, or an end of the IDLE eDRX Paging Time Window.

8. The method of claim 1, wherein the core network node is operatively connected to a set of network nodes, and wherein the plurality of network nodes are a subset of the set of network nodes.

9. The method of claim 8, wherein the plurality of network nodes were selected based on channel conditions, capability, locations, UE connectivity status, availability of communication resources, and/or availability of computational resources.

10. A method for determining an INACTIVE extended discontinuous reception (eDRX) configuration for a user equipment (UE) and performed by an access network node, wherein the method comprises:
    receiving a global parameter vector of a machine learning model from a core network node, wherein the global parameter vector defines coefficients for the machine learning model;
    updating the machine learning model with local data as input and coefficients defined by the global parameter vector;
    obtaining, from the updated machine learning model, a vector of probabilities for different INACTIVE eDRX configurations for the UE;
    based on the vector of probabilities, selecting an INACTIVE eDRX configuration for the UE;
    updating a local model parameter vector based on the selected INACTIVE eDRX configuration;
    transmitting the updated local model parameter vector to the core network node; and
    providing the selected INACTIVE eDRX configuration to the UE.

11. The method of claim 10, wherein the method further comprises:
    receiving an IDLE eDRX configuration from the core network node; and
    providing the IDLE eDRX configuration to the UE.

12. The method of claim 10, wherein the local data pertains to an IDLE eDRX cycle length, an IDLE eDRX Paging Time Window length, a number of total paging frames in eDRX cycle, a number of paging occasions for a paging frame, a start of the IDLE eDRX Paging Time Window, or an end of the IDLE eDRX Paging Time Window.

13. The method of claim 10, wherein the local model parameter vector comprises neural network weights of the machine learning model.

14. The method of claim 10, wherein the machine learning model comprises minimizing a loss function that represents extra energy used for the access network node to page the UE, due to a lowering an eDRX cycle, and that considers downlink latency of accessing the UE due to eDRX operation.

15. A core network node for determining an INACTIVE extended discontinuous reception (eDRX) configuration for user equipments (UEs), the core network node comprising processing circuitry, the processing circuitry being configured to cause the core network node to:
    transmit to a plurality of network nodes a first global parameter vector of a machine learning model for determining the INACTIVE eDRX configuration of the UEs, wherein the first global parameter vector defines coefficients for the machine learning model, wherein the plurality of network nodes comprises a first network node and a second network node;
    receive from the first network node a first local model parameter vector with locally updated coefficients for the machine learning model;
    receive from the second network node a second local model parameter vector with locally updated coefficients for the machine learning model;
    produce a second global parameter vector using the first local model parameter vector and the second local model parameter vector;
    determine whether a stopping criterion is fulfilled; and
    if the stopping criterion is not fulfilled, transmit the second global parameter vector to the plurality of network nodes, wherein determining whether the stopping criterion is fulfilled comprises to 1) compare the first global parameter vector and the second global parameter vector, and/or 2) determine whether a counter value satisfies a condition.

16. An access network node for determining an INACTIVE extended discontinuous reception (eDRX) configuration for a user equipment (UE), the access network node comprising processing circuitry, the processing circuitry being configured to cause the access network node to:
    receive a global parameter vector of a machine learning model from a core network node, wherein the global parameter vector defines coefficients for the machine learning model;
    update the machine learning model with local data as input and coefficients defined by the global parameter vector;
    obtain, from the updated machine learning model, a vector of probabilities for different INACTIVE eDRX configurations for the UE;
    based on the vector of probabilities, select an INACTIVE eDRX configuration for the UE;
    update a local model parameter vector based on the selected INACTIVE eDRX configuration;
    transmitting the updated local model parameter vector to the core network node; and
    provide the selected INACTIVE eDRX configuration to the UE.

17. A non-transitory computer readable storage medium storing a computer program comprising instructions which when executed by processing circuitry cause the processing circuitry to perform the method of claim 1.

18. A non-transitory computer readable storage medium storing a computer program comprising instructions which when executed by processing circuitry cause the processing circuitry to perform the method of claim 10.

\* \* \* \* \*